(12) United States Patent
Wallace et al.

(10) Patent No.: US 7,099,933 B1
(45) Date of Patent: Aug. 29, 2006

(54) SYSTEM AND METHOD FOR REGULATING WEB SITE ACCESS

(75) Inventors: R. Bruce Wallace, Ashton (CA); Bruce L. Townsend, Stittsville (CA)

(73) Assignee: Nortel Networks Limited, Quebec (CA)

( * ) Notice: Subject to any disclaimer, the term of this patent is extended or adjusted under 35 U.S.C. 154(b) by 919 days.

(21) Appl. No.: 09/713,292

(22) Filed: Nov. 16, 2000

Related U.S. Application Data

(60) Provisional application No. 60/217,595, filed on Jul. 11, 2000.

(51) Int. Cl.
*G06F 15/173* (2006.01)
*G06F 15/16* (2006.01)

(52) U.S. Cl. .......... 709/223; 709/224; 709/225; 709/203

(58) Field of Classification Search ........ 709/217, 709/218, 219, 223–235, 202, 206, 238, 203; 718/105; 713/153
See application file for complete search history.

(56) References Cited

U.S. PATENT DOCUMENTS

| | | | | |
|---|---|---|---|---|
| 4,788,715 A | * | 11/1988 | Lee | 379/84 |
| 6,006,269 A | * | 12/1999 | Phaal | 709/227 |
| 6,012,086 A | * | 1/2000 | Lowell | 709/218 |
| 6,134,584 A | * | 10/2000 | Chang et al. | 709/219 |
| 6,173,322 B1 | * | 1/2001 | Hu | 709/224 |
| 6,230,205 B1 | * | 5/2001 | Garrity et al. | 709/231 |
| 6,347,328 B1 | * | 2/2002 | Harper et al. | 718/105 |
| 6,360,270 B1 | * | 3/2002 | Cherkasova et al. | 709/229 |
| 6,484,257 B1 | * | 11/2002 | Ellis | 713/153 |
| 6,510,464 B1 | * | 1/2003 | Grantges et al. | 709/225 |
| 6,625,643 B1 | * | 9/2003 | Colby et al. | 709/217 |
| 6,742,016 B1 | * | 5/2004 | Bhoj et al. | 709/207 |
| 2001/0023442 A1 | * | 9/2001 | Masters | 709/227 |
| 2003/0041263 A1 | * | 2/2003 | Devine et al. | 713/201 |

* cited by examiner

*Primary Examiner*—Saleh Najjar
*Assistant Examiner*—B R Bruckart
(74) *Attorney, Agent, or Firm*—Hunton & Williams LLP

(57) ABSTRACT

A system and method are provided for regulating incoming traffic to a web site to prevent overload conditions from occurring. The system comprises a capacity determination unit for determining if a web site has additional capacity and a notification unit for notifying customers if no capacity is available. A scheduling processor provides a customer with scheduling options. When the web site has sufficient capacity, a redirect unit redirects the customer to the web site.

42 Claims, 7 Drawing Sheets

SYSTEM AND METHOD FOR REGULATING WEB SITE ACCESS

CROSS-REFERENCE TO RELATED APPLICATIONS

This patent application claims priority from Provisional patent application Ser. No. 60/217,595, filed on Jul. 11, 2000 and entitled "Internet Take-a-Number Service". This patent application is related to U.S. patent application Ser. No. 09/713,293, entitled "Technique for Adaptively Controlling the Admission of Web Server Requests" and in U.S. patent application Ser. No. 09/713,319, entitled "Technique for Adaptively Distributing Web Server Requests." The aforementioned patent applications are filed concurrently herewith and are hereby incorporated by reference in their entirety.

FIELD OF THE INVENTION

The present invention relates generally to a system and method for regulating web site access and, more particularly, to a system and method for regulating website access in order to improve upon customer service and prevent web sites from failing due to excessive volume.

BACKGROUND OF THE INVENTION

In recent years, many e-commerce businesses have suffered from managing the problem of success. The growth of e-commerce has caused web site proprietors to have frequent occasion to reevaluate their hardware and software needs for their web sites. Frequently, a web site proprietor faces the realization that an initial amount of software and hardware allocated to a web site is insufficient to accommodate a number of concurrent users accessing the web site (i.e., the "load" on the web site). Additionally, response times for accessing the web site, performing certain activities within the web site, and retrieving desired information from the web site may become so slow that a user of the web site exits the web site due to the slow response time. On extreme overload conditions, some customers will receive "server not available" errors and will not be able to get access. It is additionally possible that customers could be dropped in the middle of a transaction. Ultimately, the entire web site could fail under the load. Examples of sites experiencing overload problems include Amazon.com and Barnes & Noble, which experienced overload during the release of the new Stephen King novel. Additionally, the Victoria's Secret web site failed completely during its first fashion show.

Web site proprietors, such as Internet "start-up companies," are initially uncertain as to the loads their web sites will be required to handle. Such web sites may initially be developed on a small scale, and the web site proprietors may have an intention of expanding the web sites in the future. However, if a web site is selling products or services which are in great demand or the web site offers incentives to users who access the web site in order to increase the number of users of the web site, or the web site is actively engaged in advertising and publicizing the products or services sold via the web site, the web site often ends up becoming quickly overburdened by a large number of concurrent users. The proprietor of the web site may not be able to respond quickly enough by adding hardware and software to the web site to address the large number of concurrent users. Consequently, the web site may experience technical difficulties such as "crashes" or slow response times because it was not designed to handle the traffic level loads. Such technical difficulties frequently cause consumer dissatisfaction. The web site proprietor may lose potential customers while trying to redesign the web site to meet the large volume of concurrent users.

In view of the foregoing, it would be desirable to provide a technique for managing web site traffic which overcomes the above-described inadequacies and shortcomings. In traditional businesses, companies are able to limit the number of customers they service through limiting physical access to stores or placing customers on hold on phone lines. A system and/or method is needed to avoid web site technical difficulties, such as web site crashes and slow response times, among other difficulties, by limiting the number of concurrent users that can access the web site and notifying customers that web site access is not currently available.

SUMMARY OF THE INVENTION

In accordance with the purposes of the invention as embodied and broadly described herein, there is provided an internet customer access system comprising a redirect receiving unit for generating a request for a capacity determination of a web site. The system further comprises a capacity determination unit for determining if the web site has the capacity to handle an additional customer and a notification unit for notifying the customer if the web site currently has insufficient capacity to accommodate additional customers. A redirect unit redirects the customer to the web site if sufficient capacity is found.

In a further aspect of the invention, an internet customer access system is provided comprising a capacity determination unit for determining if the web site has the capacity to handle an additional customer and a scheduling processor for scheduling access of the customer to the web site if the capacity determination unit indicates that no current capacity exists. A customer identification unit is provided for determining whether a customer has scheduled access to the web site.

In an additional aspect, the invention comprises a method for regulating access to a web site. The method comprises the steps of receiving a web site access request, determining whether the web site has sufficient capacity to accommodate a customer, redirecting the customer to the web site if sufficient capacity is found, and notifying the visitor if insufficient capacity is found.

In yet a further aspect of the invention, a method for regulating access to a web site is provided. The method comprises the steps of determining if the web site has sufficient capacity to handle a customer, scheduling access of the customer to the web site if insufficient capacity is found, and determining whether the customer has previously scheduled access to the web site.

These and other features, objects, and advantages of the preferred embodiments will become apparent when the detailed description of the preferred embodiments is read in conjunction with the drawings attached hereto.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the testings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE PREFERRED EMBODIMENTS

Figure 1:
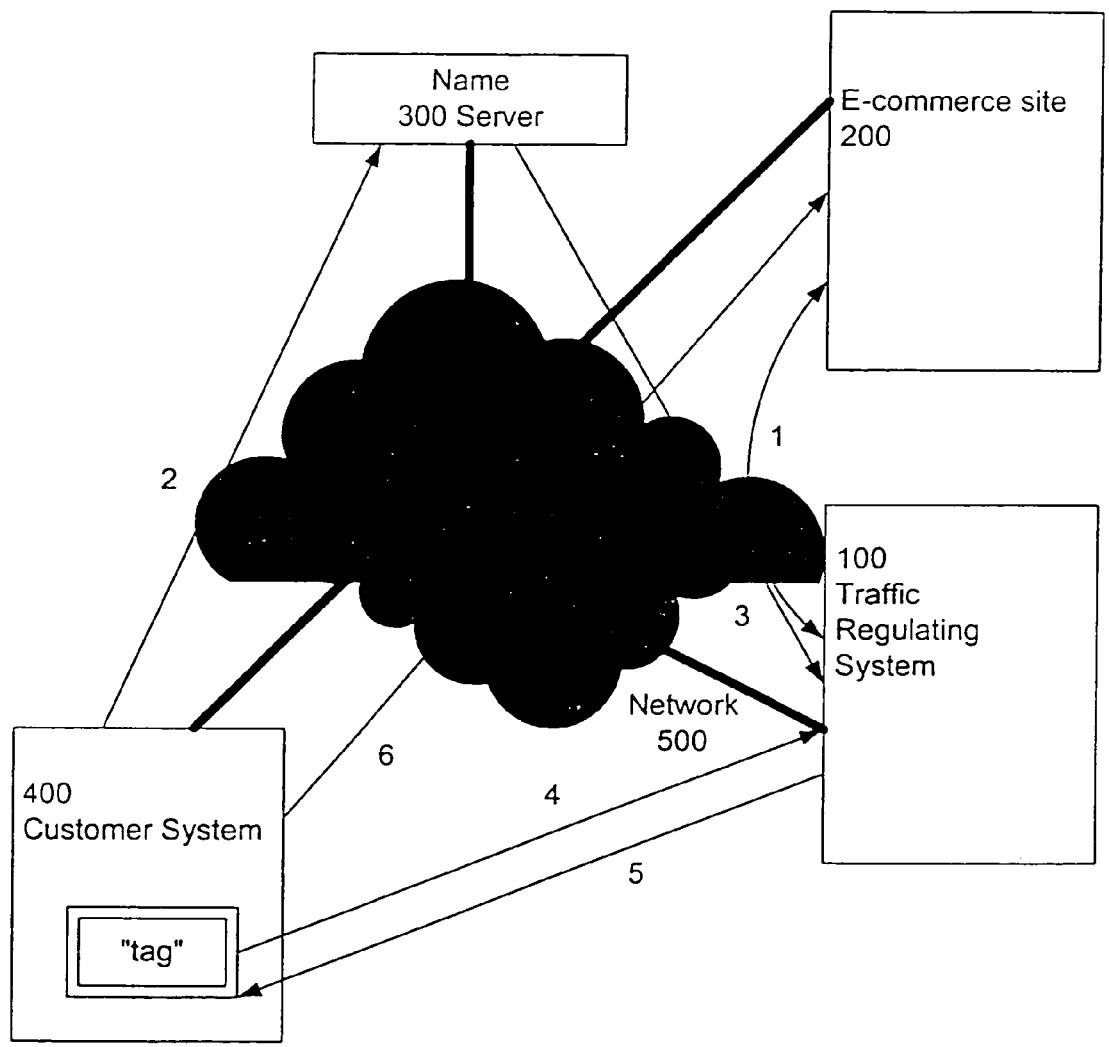
FIG. 1 is a block diagram illustrating the environment of an incoming traffic control system for regulating web site traffic.

Reference will now be made in detail to the present preferred embodiments of the invention, examples of which are illustrated in the accompanying drawings in which like reference numerals refer to corresponding elements.

FIG. 1 is a block diagram illustrating an embodiment of the system for controlling incoming traffic to a web site. The incoming traffic regulating system 100 interacts with a web site 200, a name server 300, and a customer system 400 through the use of a network 500 such as the Internet.

The customer system 400 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Customer 400 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Customer system 400 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art.

The server 300 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

The traffic regulating system 100 and the web site 200 exchange status information on the ability for the web site 200 to handle new loads as illustrated by path 1. When the customer system 400 attempts to access the web site 200 and connects to the name server 300 as shown by path 2, the name server 300 directs the request to the traffic regulating system 100 instead of the actual web site 200 as shown by path 3. Through the exchange of information between the traffic regulating system 100 and the web site 200, the traffic regulating system 100 determines whether the web site 200 has the capacity to handle an additional customer. This exchange of information can occur in two different ways. In the first case, the traffic regulating system 100 queries the web site 200 for capacity information upon receiving each request. In the second case, the traffic regulating system 100 queries the web site 200 at predetermined intervals. In the latter case, when a request for a capacity determination is received, the decision as to whether capacity is available is made based on the result of the most recent query. If the web site 200 has the capability to handle an additional customer 400, the customer system 400 is redirected to the web site as shown by paths 5 and 6.

As will further be explained in detail below, when the traffic regulating system 100 determines that insufficient capacity is available, it may attach an encrypted tag to the customer system 400. When the customer system 400 attempts access again, the traffic regulating system 100 locates the tag and removes it when the customer system 400 is redirected to the web site 200 as shown by paths 4 and 5. If the web site 200 does not have capacity to handle an additional customer 400 and the customer 400 does not have a tag, the traffic regulating system 100 displays a web page to the customer system 400 via path 5. The web page informs the customer system 400 of the lack of capacity and available options. At this point, the customer system 400 is able to select an option as will be further explained below. After selecting an option, the customer is free to browse elsewhere or go off line. If the web page provided to the customer system 400 provides scheduling options and the customer elects to schedule web site access, a tag is attached to the customer system via paths 4 and 5. In a preferred embodiment, the tag is an encrypted cookie. The tag may also be an unencrypted cookie or any other type of encrypted or unencrypted tag. Encryption can be used to prevent intentional overloading. For instance, if the tag is not encrypted, the customer might obtain the tag and forward it to other customers for their use. A tag that is encrypted specifically to a customer system avoids reuse or sharing by unauthorized customers. When the customer system 400 again attempts to access the web site 200, the customer system 400 is redirected to the traffic regulating system 100 as explained above. The traffic regulating system 100 determines whether the customer system 400 has a valid or current tag. If the tag is valid, the customer system 400 is redirected immediately to the web site 200 via paths 5 and 6.

Figure 2:
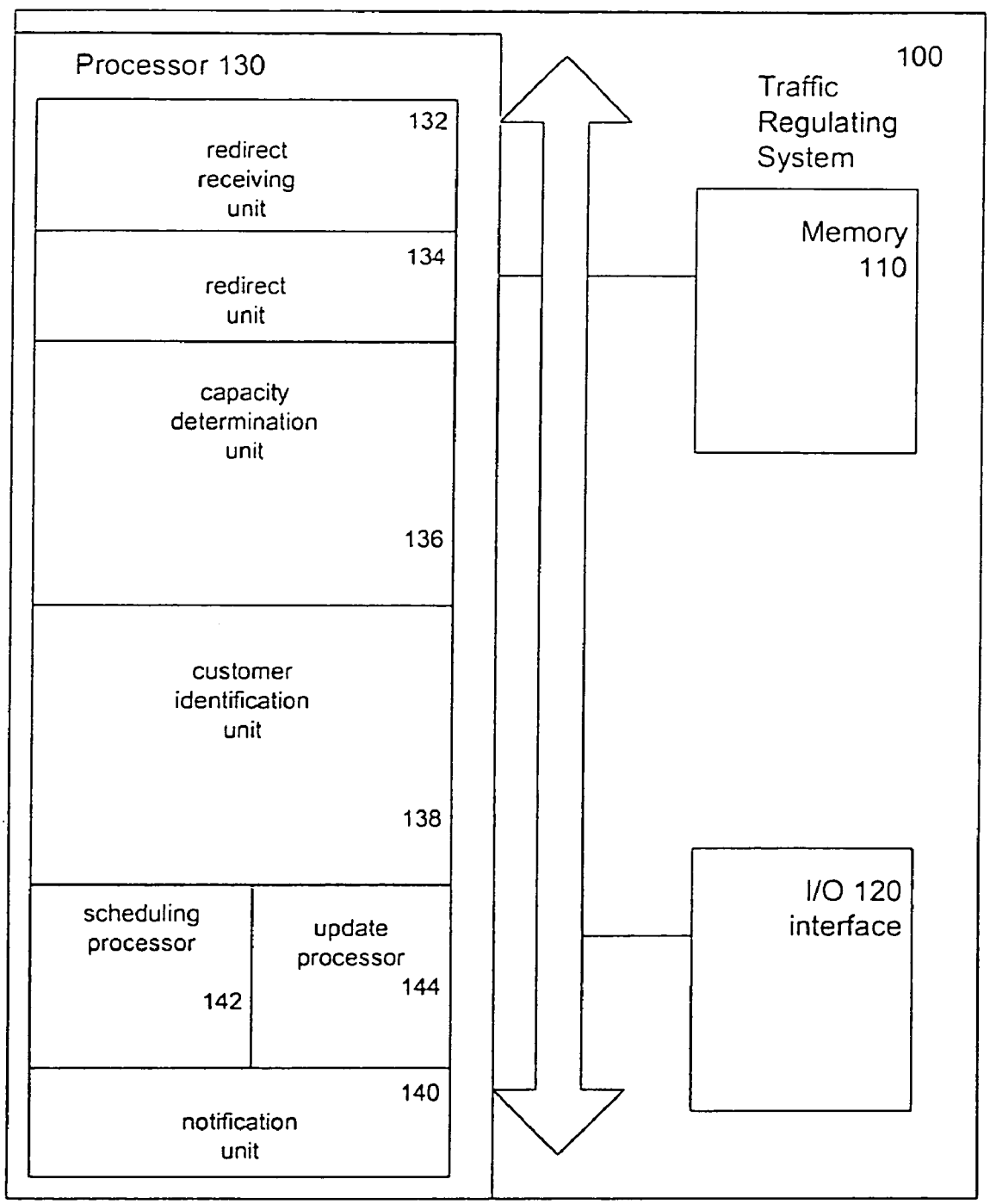
FIG. 2 is a block diagram illustrating the components of an embodiment the incoming traffic control system for regulating web site traffic.

FIG. 2 is block diagram illustrating the components of an embodiment of the traffic regulating system 100. The traffic regulating system 100 comprises standard components such as a memory 110 and an I/O interface 120. A processor 130 includes processing components including a redirect receiving unit 132 for receiving redirected customer requests from the network server 300 and requesting a capacity determination. The traffic regulating system 100 also includes a redirect unit 134 for redirecting the customer system 400 to the web site 200 when capacity is available as determined by a capacity determination unit 136. Available capacity may be determined in any manner known to those skilled in the art and will depend upon the particular hardware and software configuration of the web site 200 as well as the desired response time for accommodating customers. A notification unit 140 is provided for notifying customers if insufficient capacity is available. The notification unit 140 also has the capability to attach a tag to the customer system 400. The notification unit 140 includes a scheduling processor 142 and an update processor 144. Embodiments of the scheduling processor 142 and the update processor 144 are further disclosed below. Finally, the traffic regulating system 100 additionally includes a customer identification unit 138 which is capable of discerning whether a customer system has been provided with a tag.

Figure 3:
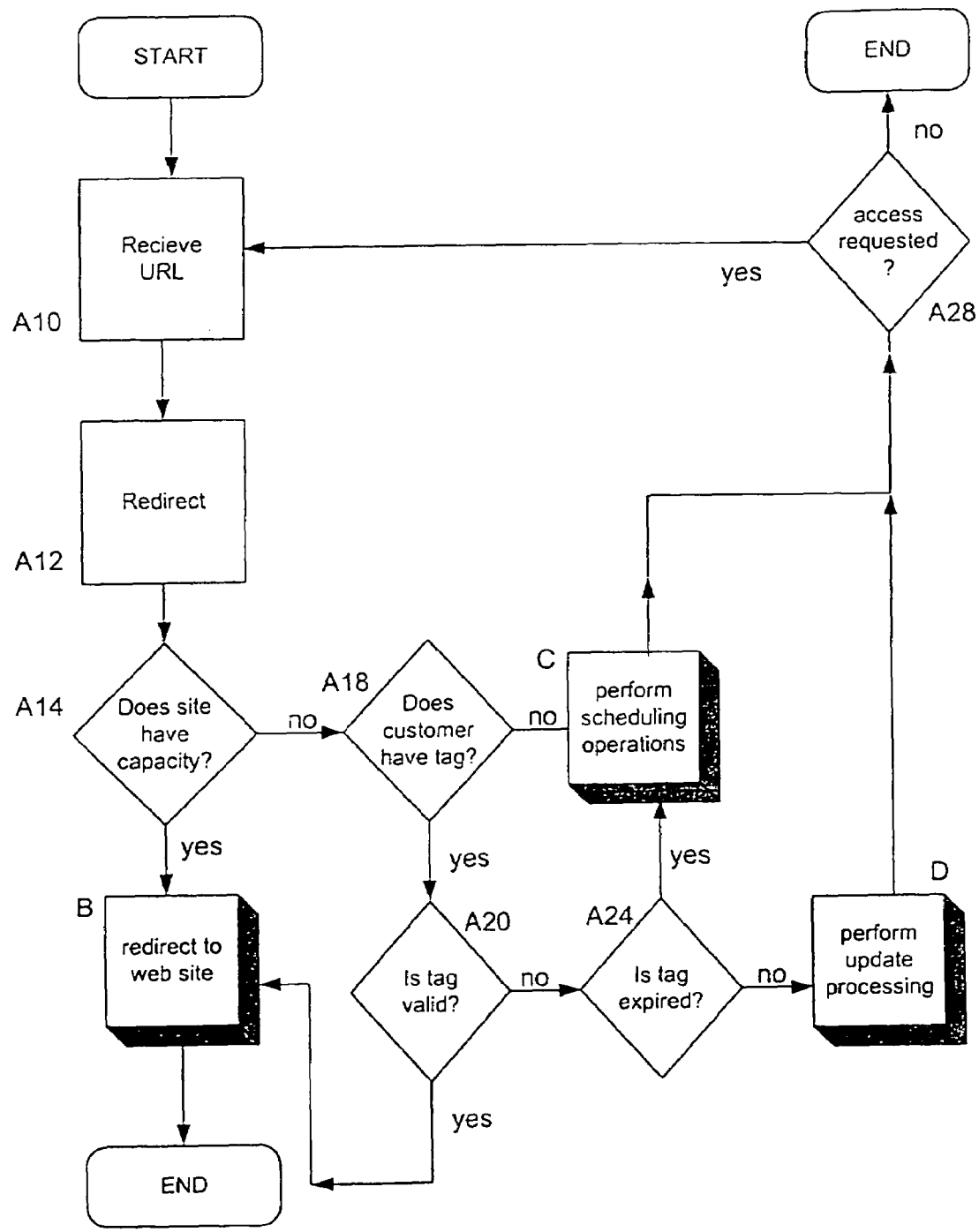
FIG. 3 is a flow chart illustrating an embodiment of the method for regulating web site traffic.

FIG. 3 is a flow chart illustrating a method for controlling incoming traffic to a web site in accordance with an embodiment of the invention. In step A10, a universal resource locator (URL) is received from the customer system 400. In step A12, the network server 300 redirects the request to the traffic regulating system 100. In step A14, the traffic regulating system 100 exchanges information with the web site 200 to determine whether the web site 200 has capacity. As set forth above, the exchange of information between the web site 200 and the customer system 400 can occur upon each request or at regular predetermined intervals. If the latter method is used, the capacity determination is based upon the most recent regularly scheduled inquiry. If it is determined that the web site 200 does have sufficient capacity, the customer system 400 is redirected to the web site 200 in procedure B. Procedure B is further described below in conjunction with FIG. 4. If the web site 200 has insufficient capacity, the traffic regulating system 100 determines in step A18 whether the customer has a tag. If the traffic regulating system 100 determines in step A18 that the customer does have a tag, the customer identification unit 138 of traffic regulating system 100, further inquires in step A20 whether the tag is valid. If the tag is valid in step A20, the customer 400 is immediately redirected to the web site in procedure B. If in step A18, the traffic regulating system 100 determines that the customer does not have a tag, scheduling operations are performed in accordance with procedure C. The embodiments of procedure C are further described below in conjunction with FIGS. 5 and 6.

Additionally, if in step A20, the tag is determined to be invalid, the system 100 determines whether the tag is expired in step A24. If the tag is determined to be expired in step A24, the traffic regulating system 100 performs scheduling operations C as indicated above according to the embodiment shown in FIG. 5 or 6. If in step A24, the tag is not expired, the traffic regulating system 100 proceeds to procedure D to perform update processing. Update processing may be performed in accordance with either of the embodiments shown in FIGS. 7 and 8 as will be further explained below. In step A28, the user may again request access by entering the URL of the web site 200.

Figure 4:
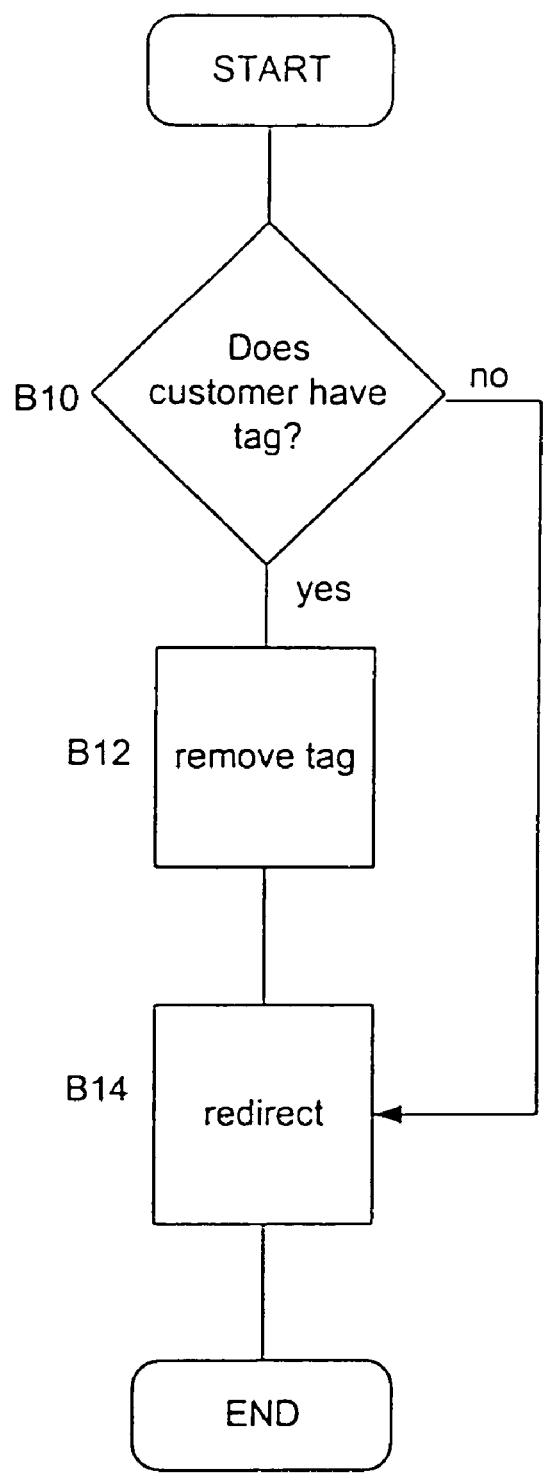
FIG. 4 is a flow chart illustrating the sub-steps involved in a redirect procedure of the method for regulating web site traffic.

FIG. 4 is a flow chart illustrating the steps involved in an embodiment of the redirect procedure. In step B10, the traffic regulating system 100 determines if the customer system 400 has a tag. If the customer system 400 has a tag, the traffic regulating system 100 removes the tag in step B12. Otherwise, the customer system is sent directly to the web site 200 in step B14. If the customer system 400 has a tag, the traffic regulating system 100 redirects the customer system 400 to the web site 200 upon removal of the tag.

Figure 5:
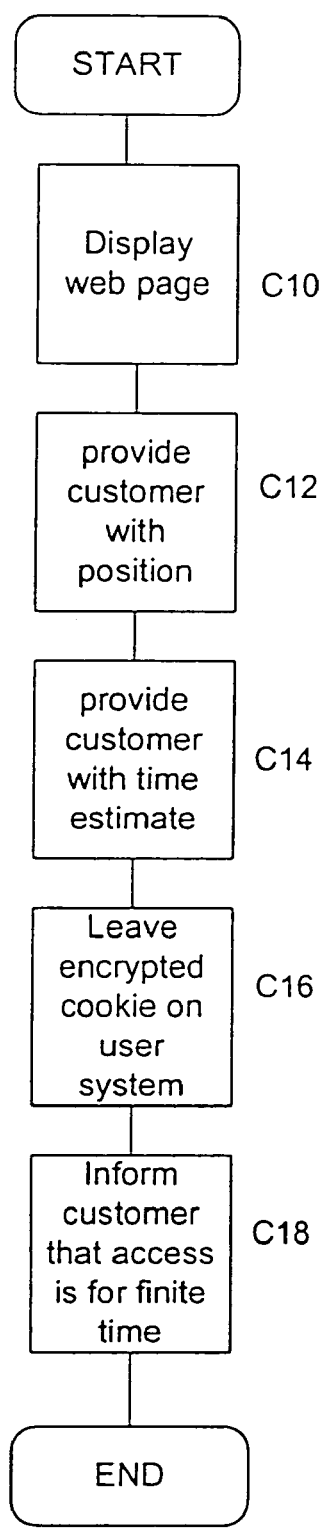
FIG. 5 is a flow chart illustrating a first embodiment of performing scheduling operations.

FIG. 5 illustrates a first embodiment of performing scheduling operations in accordance with procedure C. As set forth above, scheduling operations may be performed when the web site 200 has insufficient capacity to handle additional customers. In step C10, the traffic regulating system 100 displays a web page to the customer 400. The web page indicates that the web site is full, but that capacity will be available in the future. In step C12, the traffic regulating system 100, through the use of notification unit 140 provides the customer 400 with a position in a queue. In step C14, the notification unit 140 further provides the customer 400 with a estimated time at which the designated position in the queue will be reached. In step C16, the notification unit 140 leaves a tag on the customer system 400 indicating that the customer system 400 has logged on to the site and has been scheduled. In step C18, the traffic regulating system 100 informs the customer that access to the site will be valid for only a finite specified time.

Figure 7:
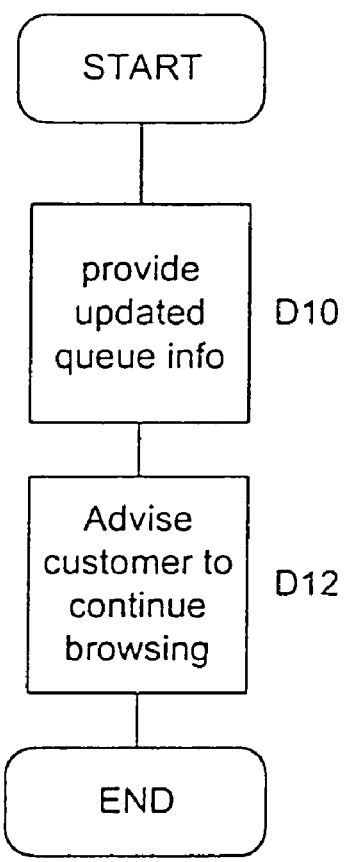
FIG. 7 is a flow chart illustrating a first embodiment of performing update processing.
Figure 8:
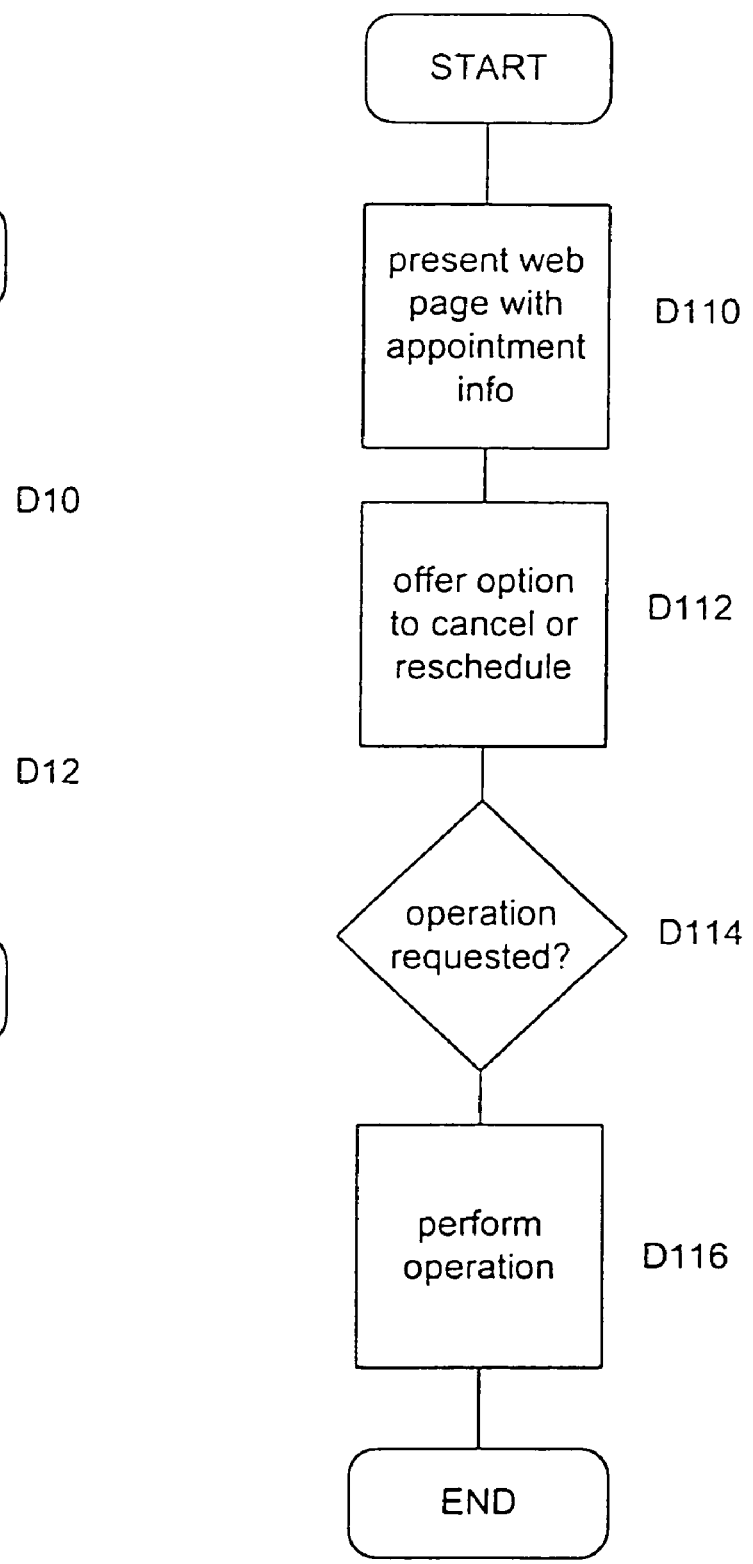
FIG. 8 is a flow chart illustrating a second embodiment of performing update operations.

In accordance with the scheduling procedure shown in FIG. 5, update processing is performed as shown in FIG. 7. In particular, when the customer 400 again attempts to log on to the system, if the customer has a tag that is not yet valid, the notification unit 140 provides the customer 400 with updated queue information in step D10. This updated queue information may comprise an updated position and a new estimated time period. In step D12, the system advises the customer to continue browsing.

Figure 6:
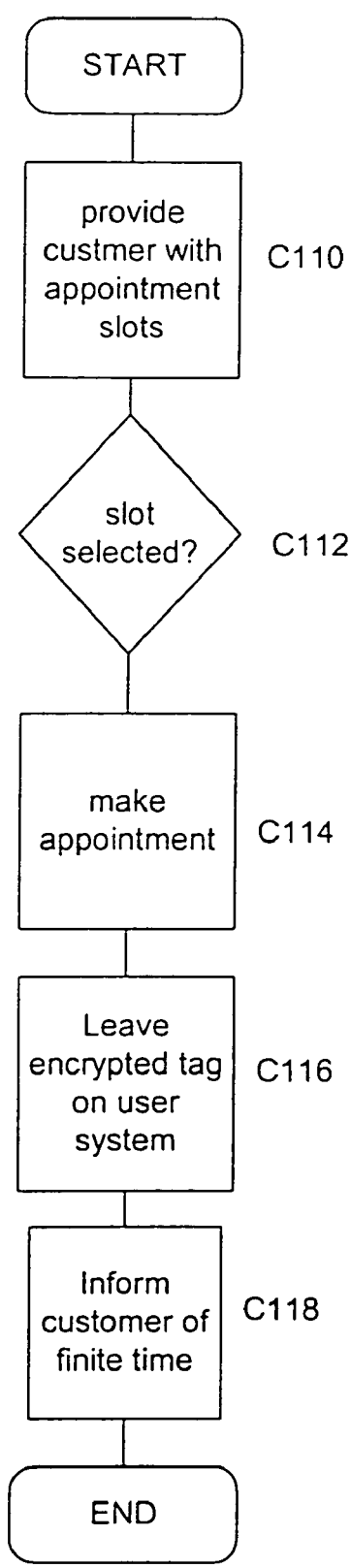
FIG. 6 is a flow chart illustrating a second embodiment of performing scheduling operations.

Alternative scheduling operations may be performed in accordance with FIG. 6. As shown in FIG. 6, the system 100 provides the customer with appointment slots in step C110. Such slots would typically include divided time periods such as 15 minute time spans in which the customer might access the web site 200. In step C112, if the customer selects a slot, the traffic regulating system 100 sets the appointment in step C114. In step C116, the traffic regulating system 100 leaves a tag on the customer system 400. In step C118, the traffic regulating system 100 informs the customer 400 that the tag is valid only for a specified time. If scheduling is performed in accordance with FIG. 6, update processing will subsequently be performed in accordance with FIG. 8 if the customer 400 attempts to access the web site before the scheduled time period. In step D110, the customer 400 is presented with the web page with appointment information. In step D112, the customer 400 is offered the option to cancel or reschedule. In step D114, if an operation is requested, the system performs the cancellation or rescheduling operation in step D116.

In the embodiments FIGS. 5 and 6, the customer 400 was provided with a tag for identification. In an alternative embodiment each customer could be provided with an alternative identifying mechanism such as a user ID/password. In this instance, upon subsequent logon, the traffic regulating system 100 would recognize the identifier and check the schedule.

Figure 9:
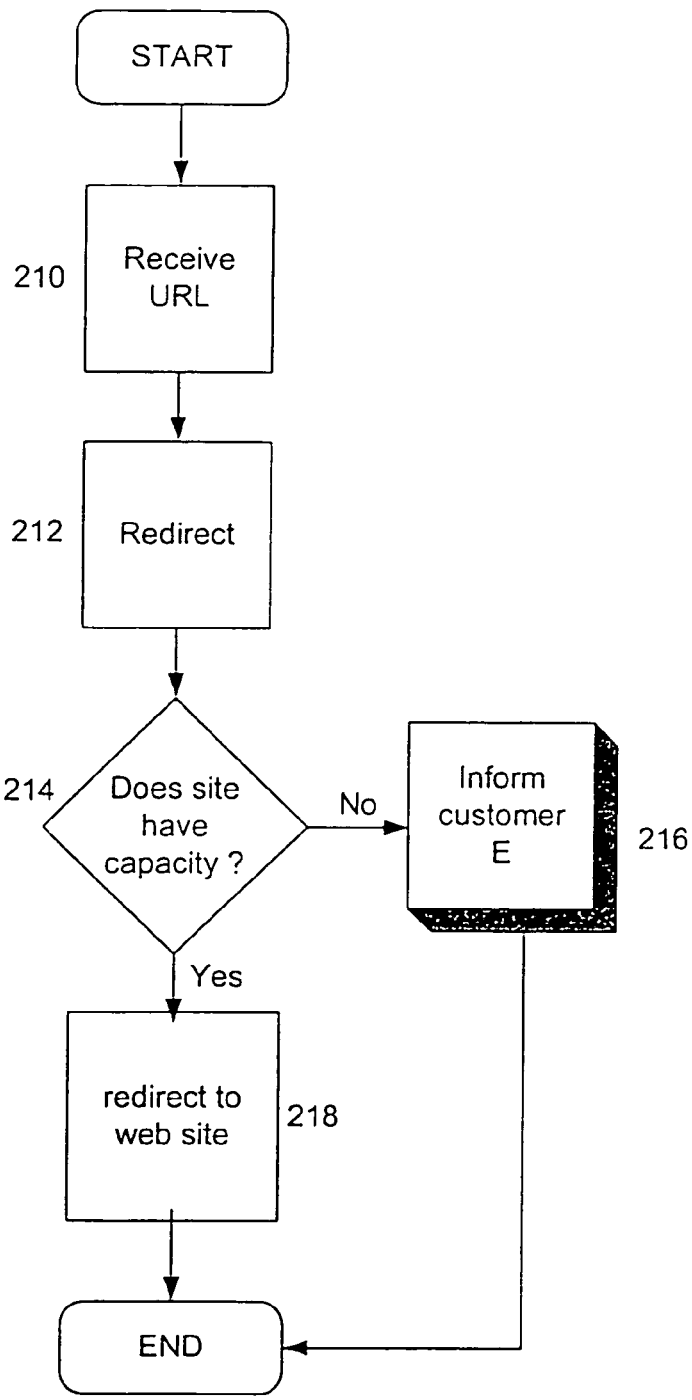
FIG. 9 is a flow chart illustrating an alternative embodiment of a method for regulating web site traffic.
Figure 10:
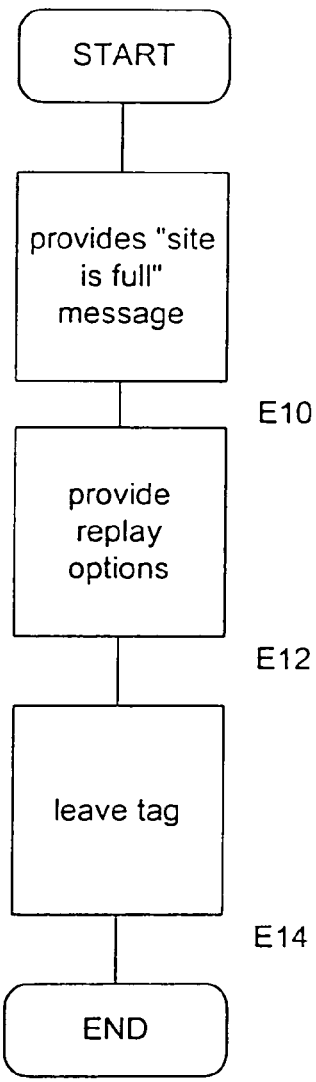
FIG. 10 is a flow chart illustrating the redirect procedures for the embodiment of FIG. 9.

FIGS. 9 and 10 illustrate an alternative embodiment of the invention in which a customer system attempts to access a web site having a temporary event. If a web site is broadcasting a live event which is limited to a duration of several hours or less, it is likely that it will not be practicable to reschedule access. However, as a service to the customer, a notification message indicating that web site capacity has been exceeded can be provided. Furthermore, it may be possible to provide replay options for interested customers. Accordingly, in FIG. 9, the URL is received in step 210. In step 212, the network server 300 redirects the request to the traffic regulating system 100. In step 214, the traffic regulating system 100 determines whether the web site 200 has sufficient capacity to accommodate an additional customer. If the capacity is available, the customer is redirected to the web site 200 in step 218. If sufficient capacity is not available, the customer is informed in procedure E.

FIG. 10 provides an embodiment of procedure E for informing the customer that the web site is full. In step E10, the traffic regulating system 100 displays a "site is full" or similar message. In step E12, the system 100 provides options to the customer for scheduling replay options. If a replay option is scheduled the traffic regulating system 100 leaves an encrypted cookie on the customer system 400 in step E14. As an alternative to the method shown in FIG. 10, the customer system 400 could merely be provided with an indication that the site is full. In this instance, no tag would be left on the customer system 400.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. An internet customer access system comprising:
   a redirect receiving unit for receiving a redirected customer request for access to a web site from a name server and generating a request for a capacity determination for the web site;
   a capacity determination unit for determining if the web site has capacity to handle an additional customer;
   a notification unit for notifying the customer if the web site currently has insufficient capacity, wherein the notification unit comprises a scheduling processor for scheduling access of the customer to the web site; and
   a redirect unit for redirecting the customer to the web site if the web site has sufficient capacity, whereupon the customer then communicates directly with the web site without further intervention by the internet customer access system.

2. The internet customer access system of claim 1, further comprising a customer identification unit for determining whether a customer has scheduled access to a web site.

3. The internet customer access system of claim 2, wherein the scheduling processor comprises means for attaching a tag to a customer system.

4. The internet customer access system of claim 3, wherein the tag comprises an encrypted cookie.

5. The internet customer access system of claim 3, wherein the customer identification unit comprises means for detecting the tag attached to the customer system and means for removing the tag from the customer system.

6. The internet customer access system of claim 2, wherein the notification unit comprises an update processor for informing a customer access system already possessing a tag of current accessibility status.

7. The internet customer access system of claim 2, wherein the scheduling processor comprises means for providing the customer with a position in a queue and means for providing an estimated service time.

8. The internet customer access system of claim 7, wherein the notification unit comprises means for providing a customer with an updated place in the queue.

9. The internet customer access system of claim 1, wherein the scheduling processor comprises means for providing appointment slots.

10. The internet customer access system of claim 1, wherein the notification unit comprises means for notifying a customer that the site is full.

11. The internet customer access system of claim 1, wherein the notification unit comprises means for notifying a customer that replay options are available.

12. An internet customer access system comprising:
    a redirect receiving unit for receiving a redirected customer request for access to a web site from a name server and generating a request for a capacity determination for the web site;
    a capacity determination unit for determining if the web site has the capacity to handle an additional customer;
    a redirect unit for redirecting the customer to the web site if the web site has sufficient capacity, whereupon the customer then communicates directly with the web site without further intervention by the internet customer access system;
    a scheduling processor for scheduling access of the customer to the web site if the capacity determination unit indicates that no current capacity exists; and
    a customer identification unit for determining whether the customer has scheduled access to the web site, wherein the redirect unit redirects the customer to the web site based on the scheduled access if the web site has sufficient capacity.

13. The internet customer access system of claim 12, wherein the scheduling processor comprises means for attaching a tag to a customer system.

14. The internet customer access system of 13, wherein the tag is an encrypted cookie.

15. The internet customer access system of claim 14, wherein the customer identification unit comprises means for detecting the encrypted cookie attached to the customer system and means for removing the encrypted cookie from the customer system.

16. The internet customer access system of claim 13, further comprising a notification unit having an update processor for informing a customer access system already possessing a tag of current accessibility status.

17. The internet customer access system of claim 13, wherein the scheduling processor comprises means for providing appointment slots.

18. The internet customer access system of claim 13, wherein the scheduling processor comprises means for providing the customer with a position in a queue and means for providing an estimated service time.

19. The internet customer access system of claim 12, further comprising a notification unit having means for notifying a customer that the site is full.

20. A method for regulating access to a web site, the method comprising the steps of:
    receiving a redirected customer request for access to a web site from a name server, wherein the redirected access request is received at an internet customer access system;
    determining whether the web site has sufficient capacity to accommodate an additional customer;

redirecting the customer to the web site if the web site has sufficient capacity, whereupon the customer then communicates directly with the web site without further intervention by the internet customer access system; and notifying the customer and scheduling customer access[1] if the web site has insufficient capacity.

21. The method of claim 20, comprising notifying the customer that replay options are available.

22. The method of claim 20, further comprising determining whether the customer has a tag.

23. The method of claim 22, further comprising determining whether the tag is valid.

24. The method of claim 23, further comprising redirecting the customer to the web site if the tag is valid.

25. The method of claim 22, further comprising determining if the tag is expired.

26. The method of claim 25, further comprising performing scheduling operations if the tag is expired and providing the customer with an updated status if the tag is not expired.

27. The method of claim 20, wherein redirecting the customer to the web site comprises the steps of determining if the customer has a tag and removing the tag if present.

28. The method of claim 20, wherein scheduling comprises providing the customer with a position in a queue.

29. The method of claim 20, wherein scheduling comprises providing the customer with an appointment.

30. The method of claim 20, wherein scheduling comprises leaving a tag on a customer system and providing the customer with a finite time for which the tag is valid.

31. The method of claim 20, further comprising determining whether a visitor has previously scheduled access to the web site.

32. The method of claim 31, further comprising providing a customer with updated position information.

33. The method of claim 31, further comprising offering a cancellation and rescheduling option upon providing updated position information.

34. A method for regulating access to a web site, the method comprising the steps of:

receiving a redirected customer request for access to a web site from a name server, wherein the redirected access request is received at an internet customer access system;

determining if the web site has sufficient capacity to handle an additional customer;

redirecting the customer to the web site if the web site has sufficient capacity, whereupon the customer then communicates directly with the web site without further intervention by the internet customer access system;

scheduling access of the customer to the web site if the web site has insufficient capacity; and determining whether a customer has previously scheduled access to the web site, wherein, if the customer has the previously scheduled access, the customer is redirected to the web site according to the previously scheduled access if the web site has sufficient capacity.

35. The method of claim 34, wherein scheduling access comprises scheduling an appointment for the customer.

36. The method of claim 34, wherein scheduling access comprises assigning the customer a position in a queue.

37. The method of claim 34, wherein scheduling access comprises providing the customer with a tag.

38. The method of claim 34, further comprising redirecting the customer to the web site if sufficient capacity is found.

39. The method of claim 34, wherein determining whether a customer has previously scheduled access to the web site comprises determining whether a customer has a tag.

40. The method of claim 39, further comprising redirecting the customer to the web site if the tag is valid.

41. The method of claim 40, further comprising performing scheduling operations if the tag is expired.

42. The method of claim 41, further comprising performing update processing if the tag is not yet valid and is not yet expired.

* * * * *